(12) United States Patent
Matsunaga et al.

(10) Patent No.: US 12,464,265 B2
(45) Date of Patent: Nov. 4, 2025

(54) IMAGE SENSOR OPERATING IN A RESET FREE PHOTOVOLTAIC MODE

(71) Applicant: OmniVision Technologies, Inc., Santa Clara, CA (US)

(72) Inventors: Yoshiyuki Matsunaga, Kyoto (JP); Keiji Mabuchi, Cupertino, CA (US); Lindsay Grant, Campbell, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 148 days.

(21) Appl. No.: 18/600,132

(22) Filed: Mar. 8, 2024

(65) Prior Publication Data

US 2025/0287120 A1    Sep. 11, 2025

(51) Int. Cl.
| | |
|---|---|
| *H04N 25/77* | (2023.01) |
| *H04N 25/63* | (2023.01) |
| *H04N 25/65* | (2023.01) |
| *H04N 25/771* | (2023.01) |
| *H04N 25/772* | (2023.01) |
| *H04N 25/78* | (2023.01) |

(52) U.S. Cl.
CPC ............. *H04N 25/77* (2023.01); *H04N 25/63* (2023.01); *H04N 25/65* (2023.01)

(58) Field of Classification Search
CPC ........ H04N 25/77; H04N 25/63; H04N 25/65; H04N 23/667; H04N 25/573; H04N 25/772; H04N 25/78
See application file for complete search history.

(56) References Cited

U.S. PATENT DOCUMENTS

| | | | |
|---|---|---|---|
| 9,338,381 B2 | 5/2016 | Kondo | |
| 11,196,947 B2 | 12/2021 | Ni | |
| 2004/0196398 A1* | 10/2004 | Doering | H10F 39/803 |
| | | | 348/308 |
| 2008/0251695 A1* | 10/2008 | Kamon | H04N 25/587 |
| | | | 250/214 AG |
| 2025/0150373 A1* | 5/2025 | Sun | H04N 25/772 |
| 2025/0211870 A1* | 6/2025 | Matsunaga | H04N 25/60 |

\* cited by examiner

*Primary Examiner* — Marly S Camargo

(57) ABSTRACT

An image sensor including a plurality of pixels arranged in a matrix. Each of the pixels includes a photodiode configured to operate both in a linear mode in which the photodiode shows a linear response to a light incident amount and in a photovoltaic mode in which the photodiode shows a logarithmic response to the light incident amount, a pixel source follower transistor configured to output a signal voltage corresponding to a signal generated based on an output of the photodiode, a pixel switch transistor configured to turn on/off an output of the pixel source follower transistor, a holding capacitor connected to an output end of the pixel switch transistor and configured to hold a voltage corresponding to the output of the photodiode, and an output source follower circuit configured to output the voltage held by the holding capacitor as a signal voltage to an AD converter.

5 Claims, 16 Drawing Sheets

IMAGE SENSOR OPERATING IN A RESET FREE PHOTOVOLTAIC MODE

TECHNICAL FIELD

The present disclosure generally relates to noise and distortion countermeasures for a captured image in an image sensor including a photodiode.

BACKGROUND INFORMATION

An image sensor includes a photodiode in each of pixel circuits, and detects a charge amount generated based on light entering each of the photodiodes.

The photodiode includes a logarithmic region where the photodiode operates with a forward bias (at high luminance) and a linear region where the photodiode operates with a reverse bias and a part of the forward bias (at low luminance). In the logarithmic region, the photodiode shows a logarithmic response to a light incident amount, and an operation mode at this time is called a photovoltaic mode. In the linear region, the photodiode shows a linear response to the light incident amount, and an operation mode at this time is called a linear mode.

In the linear region where the photodiode operates under low luminance, thermal noise called kTC noise occurs. The kTC noise is caused by switching of a reset transistor resetting accumulated charges of the photodiode. The kTC noise is an offset shift not fixed in a shift direction, appearing in an output voltage of the photodiode after reset. Therefore, the kTC noise deteriorates quality of a reproduced image.

Further, in a case where a moving object is imaged, when an exposure time is shifted among lines, an image is distorted.

SUMMARY

An image sensor according to the present disclosure is an image sensor including a plurality of pixels arranged in a matrix, and includes: an AD converter; a frame memory; and a conversion function block. Each of the pixels includes a photodiode configured to operate both in a linear mode in which the photodiode shows a linear response to a light incident amount and in a photovoltaic mode in which the photodiode shows a logarithmic response to the light incident amount, a pixel source follower transistor configured to output a signal voltage corresponding to a signal generated based on an output of the photodiode, a pixel switch transistor configured to turn on/off an output of the pixel source follower transistor, a holding capacitor connected to an output end of the pixel switch transistor and configured to hold a voltage corresponding to the output of the photodiode, and an output source follower circuit configured to output the voltage held by the holding capacitor as a signal voltage. The AD converter converts the signal voltage output from the output source follower circuit of each of the pixels into digital signal data. The frame memory stores the signal data of one frame period. The conversion function block generates an optical signal relating to the light incident amount from current signal data and signal data of a previous frame. The plurality of pixels arranged in the matrix turn on the pixel switch transistors at a same timing, and hold the signal voltages in the holding capacitors.

In the image sensor according to the present disclosure, it is unnecessary to reset the photodiode. Therefore, mixture of noise may be reduced. Further, since the pixels are driven at the same timing, occurrence of distortion in moving object imaging may be suppressed.

BRIEF DESCRIPTION OF THE DRAWINGS

Embodiments of the present disclosure will be described based on the following figures, wherein.

DESCRIPTION OF EMBODIMENTS

An embodiment of the present disclosure is described below with reference to drawings. The following embodiment does not limit the present disclosure, and configurations obtained by row-selectively combining a plurality of illustrations are also included in the present disclosure.

Premise Circuit Configuration

Figure 1:
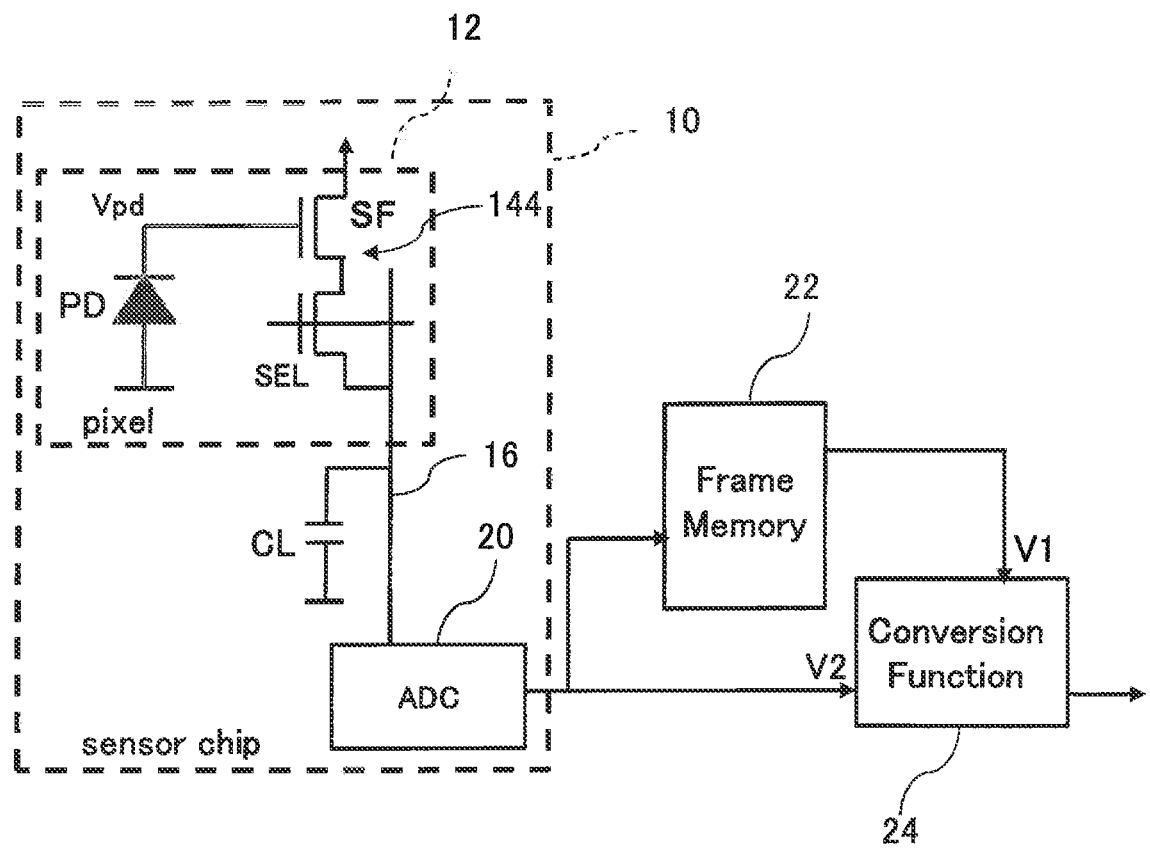
FIG. 1 is a diagram illustrating a premise configuration of a pixel circuit according to an embodiment.

FIG. 1 is a diagram illustrating a premise configuration of a pixel circuit according to the embodiment.

A sensor chip 10 includes a plurality of pixels 12 on a semiconductor substrate such as a silicon substrate. The sensor chip 10 includes the plurality of pixels 12 arranged in a matrix in a horizontal direction and a vertical direction. FIG. 1 illustrates only one pixel 12.

The pixel 12 includes a photodiode PD. The photodiode PD includes a PN junction, and generates charges by incident light. The photodiode PD in this example generates electrons by the incident light, and an output voltage Vpd is increased to a minus side as a light incident amount is increased.

Further, the photodiode PD includes two modes, namely, a linear mode in which the photodiode PD shows a linear response to the light incident amount at reverse bias and forward bias, and a photovoltaic mode in which the photodiode PD shows a logarithmic response to the light incident amount at the forward bias. When the light incident amount is small, the photodiode PD operates in the linear mode, whereas when the light incident amount is large, the photodiode PD operates in the photovoltaic mode.

A source follower circuit 144 is connected to an output end of the photodiode PD. The source follower circuit 144 includes a source follower transistor SF configured by an n-channel MOSFET, and a row selection transistor SEL configured by an n-channel MOSFET.

The output end of the photodiode PD is connected to a gate of the source follower transistor SF. A drain of the source follower transistor SF is connected to a predetermined power supply, and a source is connected to a drain of the row selection transistor SEL. A source of the row selection transistor SEL is connected to an output line 16. A row selection line connected to a vertical scan circuit described below is connected to a gate of the row selection transistor SEL.

Therefore, when the row selection line becomes a high level (H level), the row selection transistor SEL is turned on, and a voltage corresponding to a gate voltage of the source follower transistor SF is output to the output line 16. An output of the photodiode PD is supplied to the gate of the source follower transistor SF, and a signal (signal voltage) corresponding to an output voltage of the photodiode PD is output to the output line 16. In other words, a signal relating to the light incident amount of the photodiode PD is output to the output line 16. The output line 16 is provided corresponding to each column, and sources of the row selection transistors SEL of the plurality of pixels 12 arranged in the vertical direction are connected to one output line 16.

One end of a load capacitor CL is connected to the output line 16. The other end of the load capacitor CL is connected to a predetermined power supply such as a ground. The output line 16 is a line long in the vertical direction (column direction), and a parasitic capacitance generating in the output line 16 is considerably large. Therefore, the parasitic capacitance may be caused to function as the load capacitor CL.

The output line 16 is connected to an AD converter (ADC) 20. Thus, the signal voltages of the plurality of pixels 12 in a row selected by the row selection line are supplied to the AD converter 20.

The AD converter 20 converts supplied analog signal voltages into digital signal data. The obtained signal data is supplied to both of a frame memory 22 and a conversion function block 24. The frame memory 22 stores the signal data for one frame. When data of a current frame is input to the frame memory 22, signal data of a previous frame is output from the frame memory 22. An output end of the frame memory 22 is connected to the conversion function block 24, and the signal data of the previous frame is supplied to the conversion function block 24. Note that the frame is denoted by Fr as appropriate.

A current signal V2 (of current frame) and a signal V1 of the previous frame (last frame) are supplied to the conversion function block 24. The conversion function block 24 includes the Lambert W function, and outputs an optical signal in each of the pixels of the current frame from two pieces of input data. In other words, the conversion function block 24 eliminates influence of the last signal V1 from the current signal V2 to obtain an optical signal corresponding to the light incident amount of the current frame.

In the present embodiment, a reset circuit resetting the output of the photodiode PD to a predetermined voltage is not provided. Therefore, at a time point at the beginning of one frame, the photodiode PD holds accumulated charges of the last frame. The conversion function block 24 obtains the optical signal corresponding to the light incident amount of the current frame from the signal V2 of the current frame and the signal data of the last frame. At this time, the conversion cannot be calculated by an elementary function. The conversion can be calculated using the Lambert W function.

The Lambert W function is an inverse function including a linear variable x and an exponential function ex. In other words, the Lambert W function is a general term of a function W obtained as branches of converse relation of a function $f(z)=zez$, where ez is an exponential function, z is an optional complex number, and W satisfies $z=f-1(zez)=W(zez)$.

The photodiode PD includes the linear region and the logarithmic region. Therefore, an expression for obtaining a signal current Isig corresponding to two inputs of the signals V1 and V2 can be determined by applying the Lambert W function. The Lambert W function is a popular function included in built-in functions of Microsoft Excel® available from Microsoft Corporation, and can be used as appropriate.

Further, based on various kinds of experiments, simulations, and the like, a numerical table for determining the optical signal Isig as a solution from two inputs (signals V1 and V2) can be previously created. As a result, the optical signal can be obtained with reference to the table. Further, an approximate expression can be registered, and a calculation result can be output.

Figure 2:
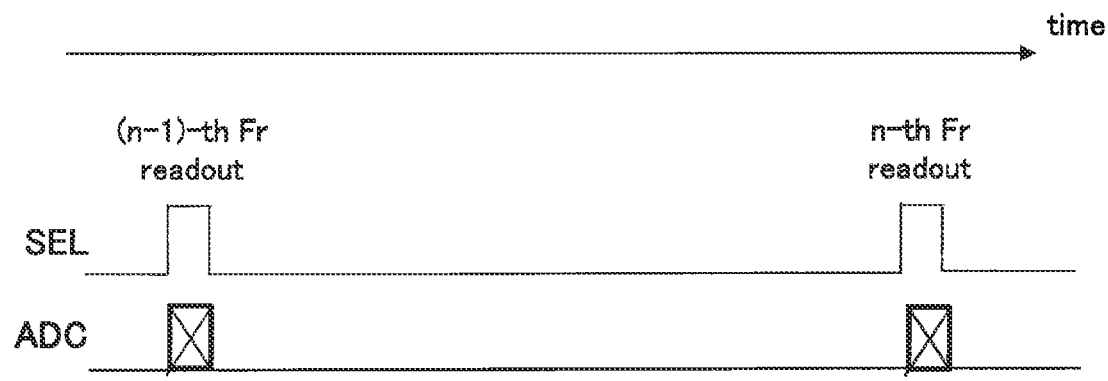
FIG. 2 is a timing chart illustrating operation of the circuit having the premise configuration in FIG. 1.

FIG. 2 is a timing chart illustrating operation of the circuit in FIG. 1. When the row selection transistors SEL of the pixels 12 in one row (one horizontal line) are turned on, signals corresponding to the outputs of the photodiodes PD of the corresponding line are read out to the output line 16. The readout signals are supplied to the AD converter (ADC) 20 and are AD-converted, and the signal V2 of the current frame of the pixels 12 in one horizontal line is output. The signal V2 is supplied to the frame memory 22 and the conversion function block 24. Further, the signal relating to the light incident amount of the current frame (signal of one horizontal line) is output from the conversion function block 24. An image signal of one frame can be obtained by repeating such operation for each horizontal line during one frame period.

In the pixel circuit in FIG. 1 described above, the reset transistor that supplies a predetermined reset voltage to the output end of the photodiode PD to reset the accumulated charges of the photodiode PD is not provided. This makes it possible to reduce a charge-voltage conversion capacitance C at the output end of the photodiode PD.

In an existing image sensor using the photodiode PD, a transfer gate is often provided at the output end of the photodiode PD. However, the transfer gate is not provided in the configuration in FIG. 1, the charge-voltage conversion capacitance C is reduced to about ½ as compared with the existing image sensor.

As described above, since the charge-voltage conversion capacitance C can be reduced in the above-described premise configuration, sensitivity of the pixel circuit can be improved to about 1.4 times to about 2 times as compared with the existing pixel circuit.

Configuration of Image Sensor by Premise Configuration

Figure 3:
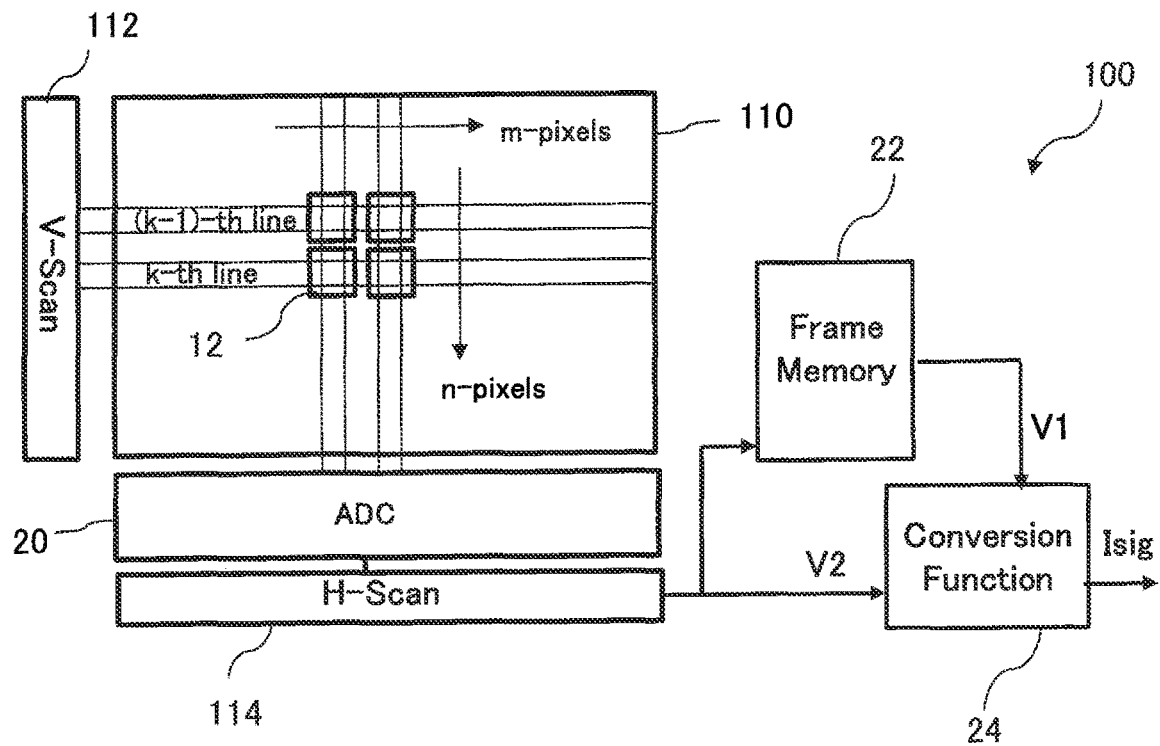
FIG. 3 is a diagram illustrating an image sensor in which pixels each having the premise configuration are two-dimensionally arranged.

FIG. 3 is a diagram illustrating an image sensor 100 in which the pixels each having the premise configuration are two-dimensionally arranged. A pixel array 110 includes the pixels 12 as described above arranged in m columns*n rows (m*n), namely, includes m pixels in the horizontal direction and n pixels in the vertical direction. A vertical scan circuit (V-Scan) 112 sequentially selects rows of the pixels 12 in the vertical direction. The pixels in each column are connected to the AD converter (ADC) 20 by a readout line in the vertical direction. A horizontal scan circuit (H-Scan) 114 is connected to the ADC 20, and image signals of the respective pixels are sequentially output from the horizontal scan circuit (H-Scan) 114.

Figure 4:
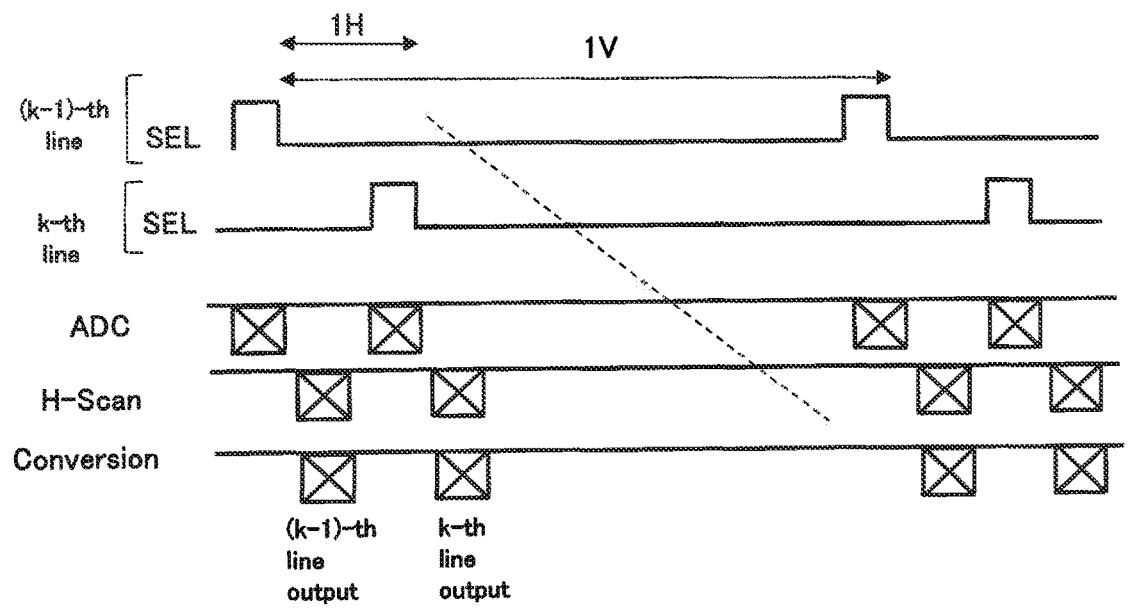
FIG. 4 is a timing chart illustrating operation of the image sensor in FIG. 3.

FIG. 4 is a timing chart illustrating operation of the image sensor 100.

In a (k−1)-th row, the row selection transistor SEL is turned on, and a signal obtained during one vertical period (1 Fr) in the photodiode PD is supplied to the ADC 20. Thereafter, exposure of next 1V starts. The readout signal is supplied to the ADC 20, and is converted into the digital signal V2. The operation is simultaneously performed on the m pixels in one horizontal line. Thereafter, the horizontal scan circuit (H-scan) 114 sequentially supplies the digital signals of the m pixels to the frame memory 22 and the conversion function block 24. The signal V1 of the previous frame is read out from the frame memory 22 and is supplied to the conversion function block 24. The conversion function block 24 determines the signal current Isig from the supplied signals V1 and V2, and the determined signal current Isig is output. The signal current Isig is determined by the conversion function block 24 from the digital signal V2 and the signal V1 stored in the frame memory 22 before 1 Fr. The signal processing is performed on the m pixels.

Global Shutter

In the case of the configuration in FIG. 1 and FIG. 3 described above, when the pixels are two-dimensionally arranged, rolling shutter operation in which the accumulation time is shifted among the lines is performed. In other words, the accumulation time of one line and the accumulation time of next line are shifted by one horizontal period. Accordingly, a problem of the rolling shutter operation is that, when a moving object is imaged, a reproduced image is distorted.

Figure 5:
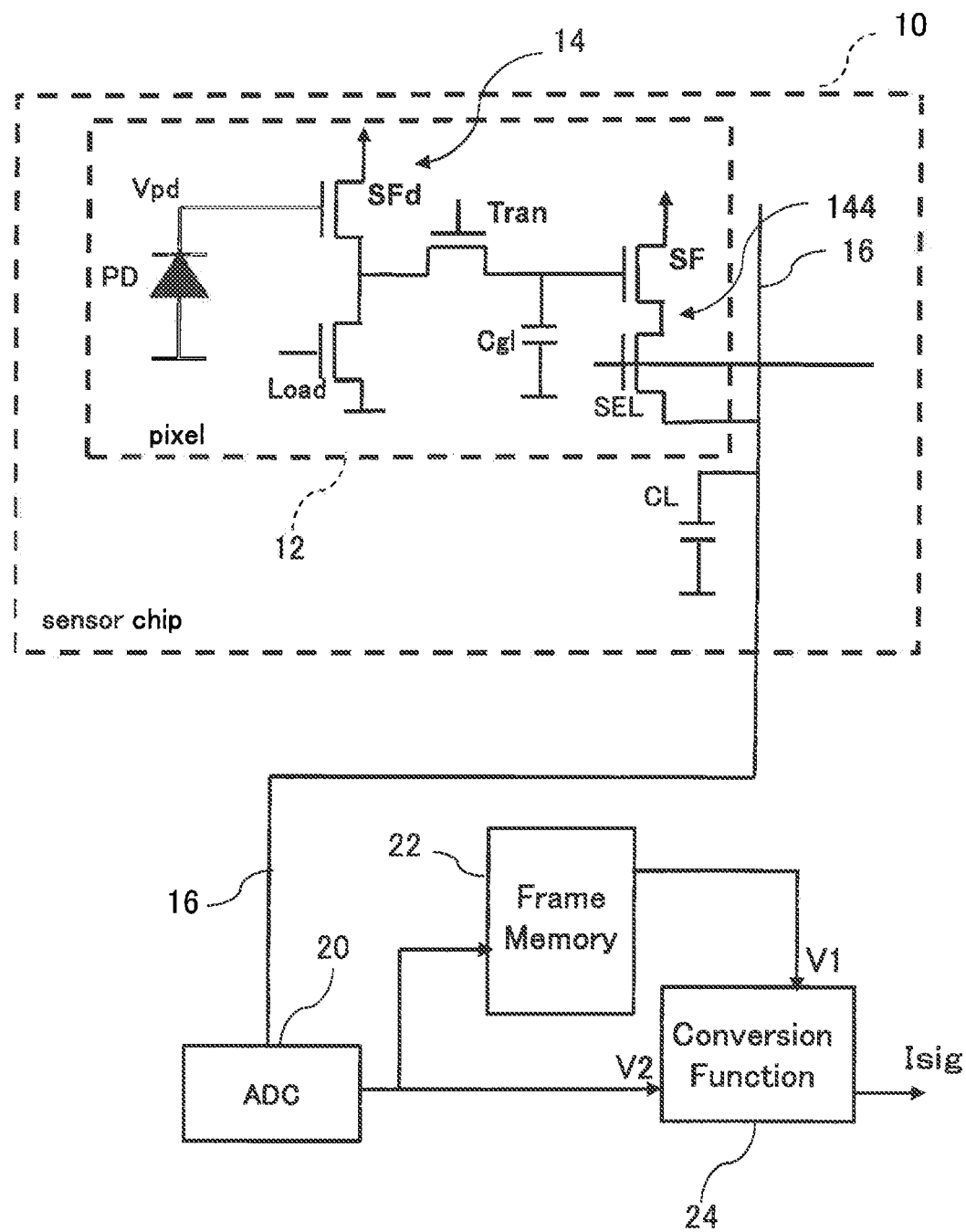
FIG. 5 is a diagram illustrating a configuration of the pixel circuit according to the embodiment.

FIG. 5 is a diagram illustrating a configuration of the pixel circuit according to the embodiment. The pixel configuration is obtained by adding a pixel source follower transistor SFd, a load transistor Load, a transfer transistor Tran, and a transfer capacitor Cgl to the pixel configuration in FIG. 1. The pixel source follower transistor SFd, the load transistor Load, and the transfer transistor Tran are all n-channel FETs.

More specifically, the output end of the photodiode PD is connected to a gate of the pixel source follower transistor SFd. A drain of the pixel source follower transistor SFd is connected to a power supply, and a source is connected to a power supply such as a ground through the load transistor Load. A drain of the transfer transistor Tran is connected to the source of the pixel source follower transistor SFd, and a source of the transfer transistor Tran is connected to one end of the transfer capacitor Cgl and the gate of the source follower transistor SF. The other end of the transfer capacitor Cgl is connected to a power supply such as a ground.

The drain of the source follower transistor SF is connected to a power supply, the source is connected to the drain of the row selection transistor SEL, and the source of the row selection transistor SEL is connected to the output line 16. The configurations of the source follower transistor SF and the row selection transistor SEL are the same as the configurations of the circuit in FIG. 1.

Figure 6:
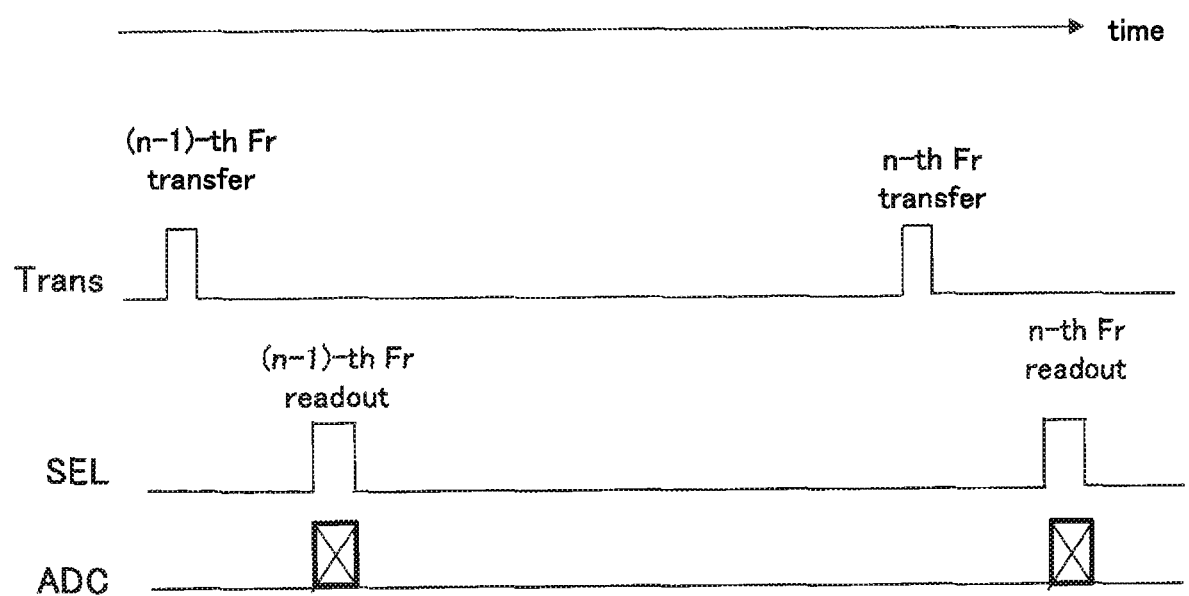
FIG. 6 is a timing chart illustrating operation of the pixel circuit in FIG. 5.

FIG. 6 is a timing chart illustrating operation of the circuit in FIG. 5. When the accumulation period of one frame ends, the transfer transistor Tran is turned on, and the output signal of the photodiode PD is transferred to and accumulated in the transfer capacitor Cgl. Thereafter, the transfer transistor Tran is turned off and the row selection transistor SEL is turned on to read out the signal to outside of the pixel through the source follower transistor SF.

Configuration of Image Sensor

Figure 7:
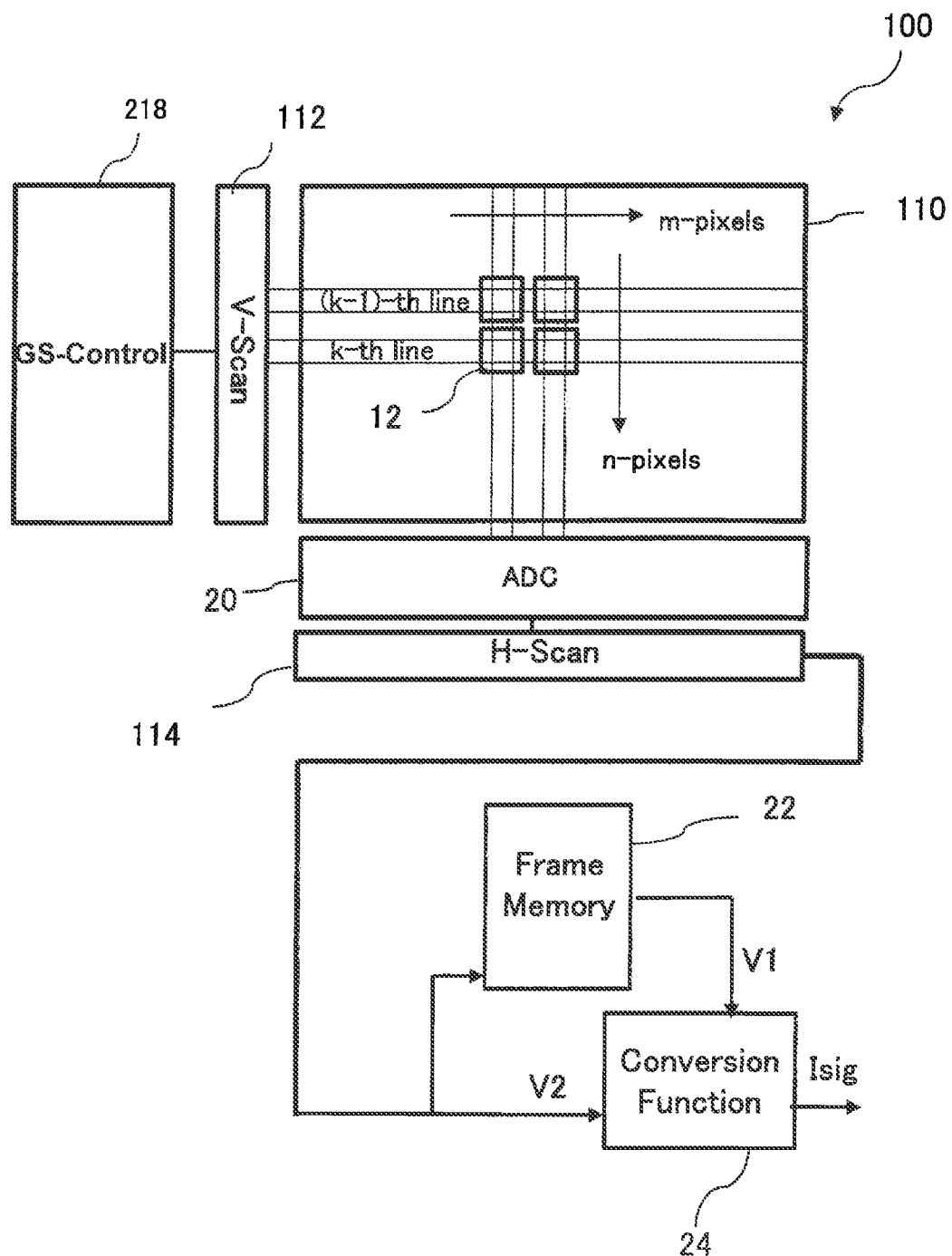
FIG. 7 is a diagram illustrating a configuration of an image sensor according to the embodiment.

FIG. 7 is a diagram illustrating a configuration of the image sensor 100 according to the embodiment. As illustrated, a basic configuration is the same as the configuration in FIG. 3; however, the image sensor 100 further includes a global shutter control unit (GS-Control) 218 in addition to the pixel array 110, the vertical scan circuit (V-Scan) 112, the AD converter (ADC) 20, and the horizontal scan circuit (H-Scan) 114. The global shutter control unit (GS-Control) 218 controls an on timing of the transfer transistor Tran.

Figure 8:
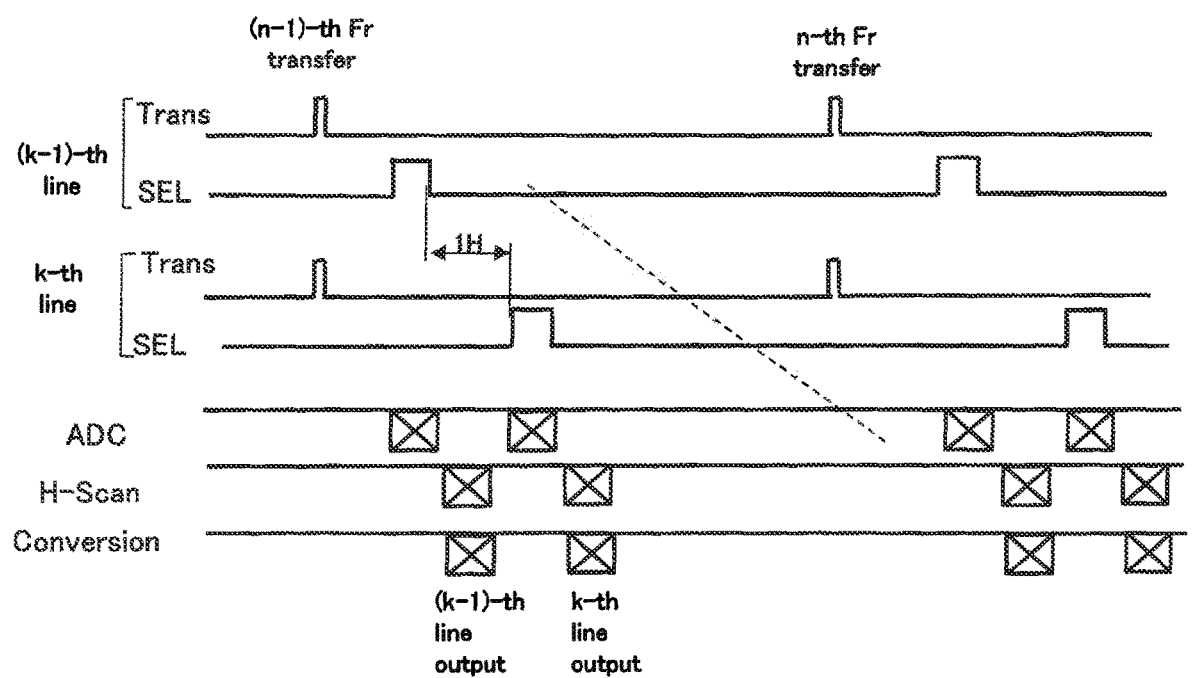
FIG. 8 is a timing chart illustrating operation of the image sensor in FIG. 7.

FIG. 8 is a timing chart illustrating operation of the image sensor in FIG. 7. As illustrated, at a time when the accumulation period of an (n−1)-th frame ends, the transfer transistors Tran of the pixels (all pixels) 12 in all horizontal lines are turned on at the same timing. As a result, the signals at the same timing are held in the transfer capacitors Cgl of all the pixels. After that, the transfer transistors Tran of the pixels (all pixels) 12 in all horizontal lines are turned off at the same timing.

Next, during the accumulation period of an n-th frame, the vertical scan circuit (V-Scan) 112 sequentially performs operation to turn on the row selection transistors SEL of the pixels 12 in one horizontal line row by row. In other words, operation in which the row selection transistors SEL of the pixels in a (k−1)-th line are turned on, and then the row selection transistors SEL of the pixels in a k-th line are turned on at a timing delayed by 1H is sequentially repeated. As a result, the signals of the (n−1)-th frame are sequentially output during the signal accumulation period of the n-th frame. As the transfer transistors Tran of the pixels (all pixels) 12 in all horizontal lines are turned off in the period of n-th Fr accumulation, the signals of the (n−1)-th frame are readout independently from n-th Fr signals.

In the above-described manner, in the image sensor 100 according to the present embodiment, the signal accumulation periods of all the pixels can be made the same, whereas the image signals can be output while the readout horizontal line is sequentially moved in the vertical direction in a conventional manner.

Even in this example, the reset transistor RST is not used in the pixel circuit, and noise caused by the reset transistor RST can be reduced.

Further, the signal V2 of the current frame are supplied to the frame memory 22, and the signal V1 of the previous frame is output from the frame memory 22. The conversion function block 24 outputs the signal current (Isig) as the optical signal based on the signal V2 of the current frame and the signal V1 of the previous frame. The configuration of the conversion function block 24 is as described above.

Modification 1

Figure 9:
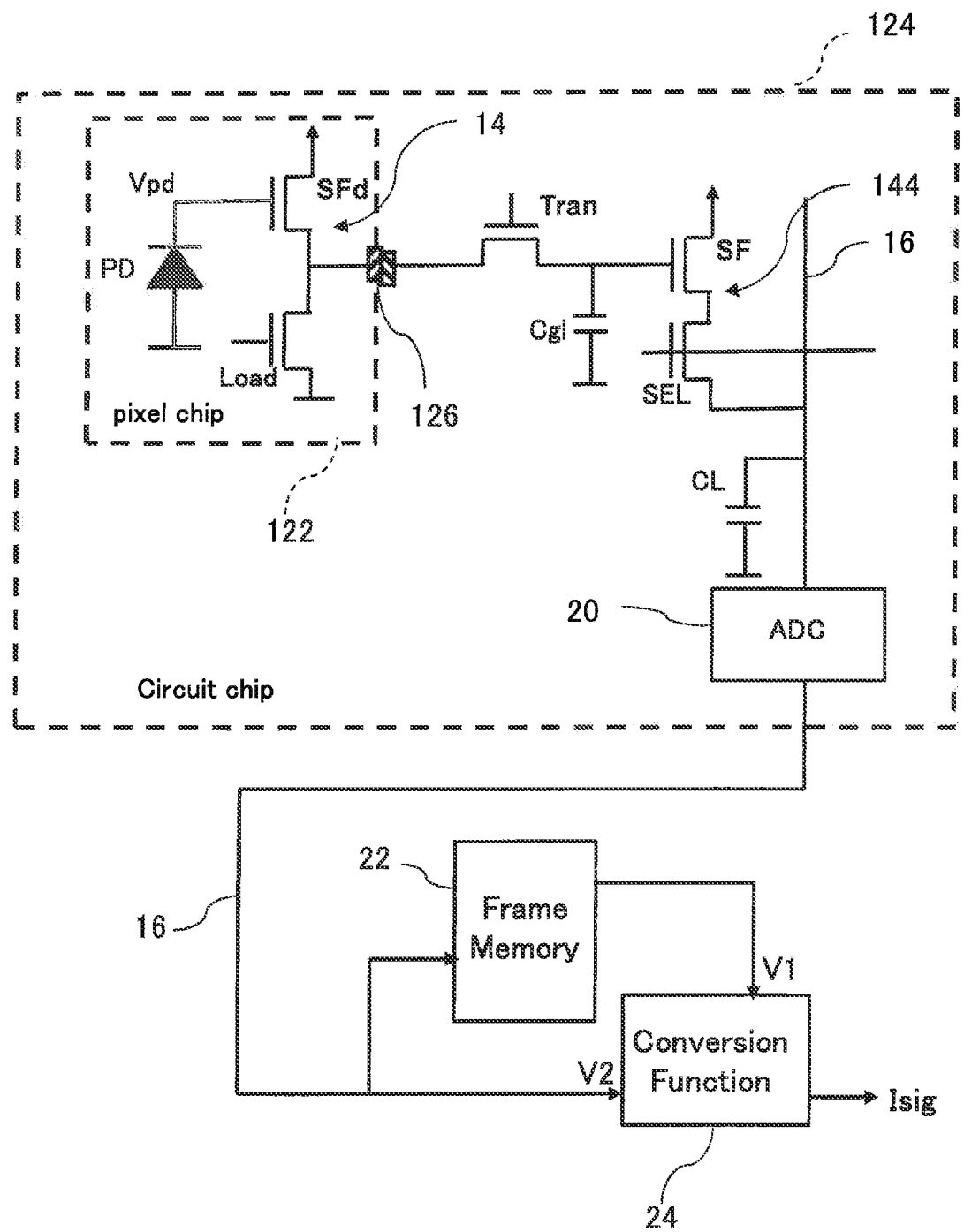
FIG. 9 is a diagram illustrating a configuration according to a modification 1.

FIG. 9 is a diagram illustrating a configuration according to a modification 1. In the pixel circuit according to the present embodiment illustrated in FIG. 5, the reset transistor RST is omitted to enable miniaturization of the pixel and signal integration of the global shutter. In the configuration, however, the pixel source follower transistor SFd, the load transistor Load, the transfer transistor Tran, and the transfer capacitor Cgl are added to the pixel as compared with the configuration in FIG. 1. Accordingly, a semiconductor chip mounted with the pixels 12 cannot be sufficiently miniaturized.

U.S. Pat. No. 9,338,381 discloses that one pixel circuit is dividedly provided on two chips.

FIG. 9 is the diagram illustrating the configuration according to the modification 1. In the modification 1, the pixel source follower transistor SFd and the load transistor Load are arranged on a pixel chip 122, and the transfer transistor Tran, the transfer capacitor Cgl, the source follower transistor SF, the row selection transistor SEL, and the AD converter (ADC) are arranged on a circuit chip 124. A line from the pixel source follower transistor SFd and the transfer transistor Tran are connected by a pixel contact 126 provided on both chips.

Using the configuration makes it possible to simplify the configuration of the pixel circuit on the pixel chip 122 and to achieve miniaturization.

In the circuit in FIG. 9, a dark current of each of the source of the pixel source follower transistor SFd, the drain of the load transistor Load, and the source of the transfer transistor Tran is extremely greater than a dark current of the photodiode PD. To suppress influence by the dark currents, increase in current caused to flow through the pixel source follower transistor SFd is effective.

When a sum of the dark currents of the source of the pixel source follower transistor SFd, the drain of the load transistor Load, and the source of the transfer transistor Tran is denoted by Idrk, an equivalent dark current Ideq converted into the output of the photodiode PD is obtained as follows, $$Ideq=Idrk^2/Idd$$

where Idd is a drain current of the pixel source follower transistor SFd. When Idrk=1000 (1000: number of electrons)*q/s (q: elementary charge) and Ideq=1 (1: number of electron)*q/s (target dark current=1 electron/s) are assumed, Idd=about 0.16 pA is obtained.

Accordingly, causing the drain current of 0.16 pA or more to flow through the pixel source follower transistor SFd makes it possible to ignore increase in dark current caused by addition of the pixel source follower transistor SFd.

Note that influence of the dark current of the drain of the transfer transistor Tran can be suppressed by increasing the transfer capacitor Cgl.

Modification 2

Figure 10:
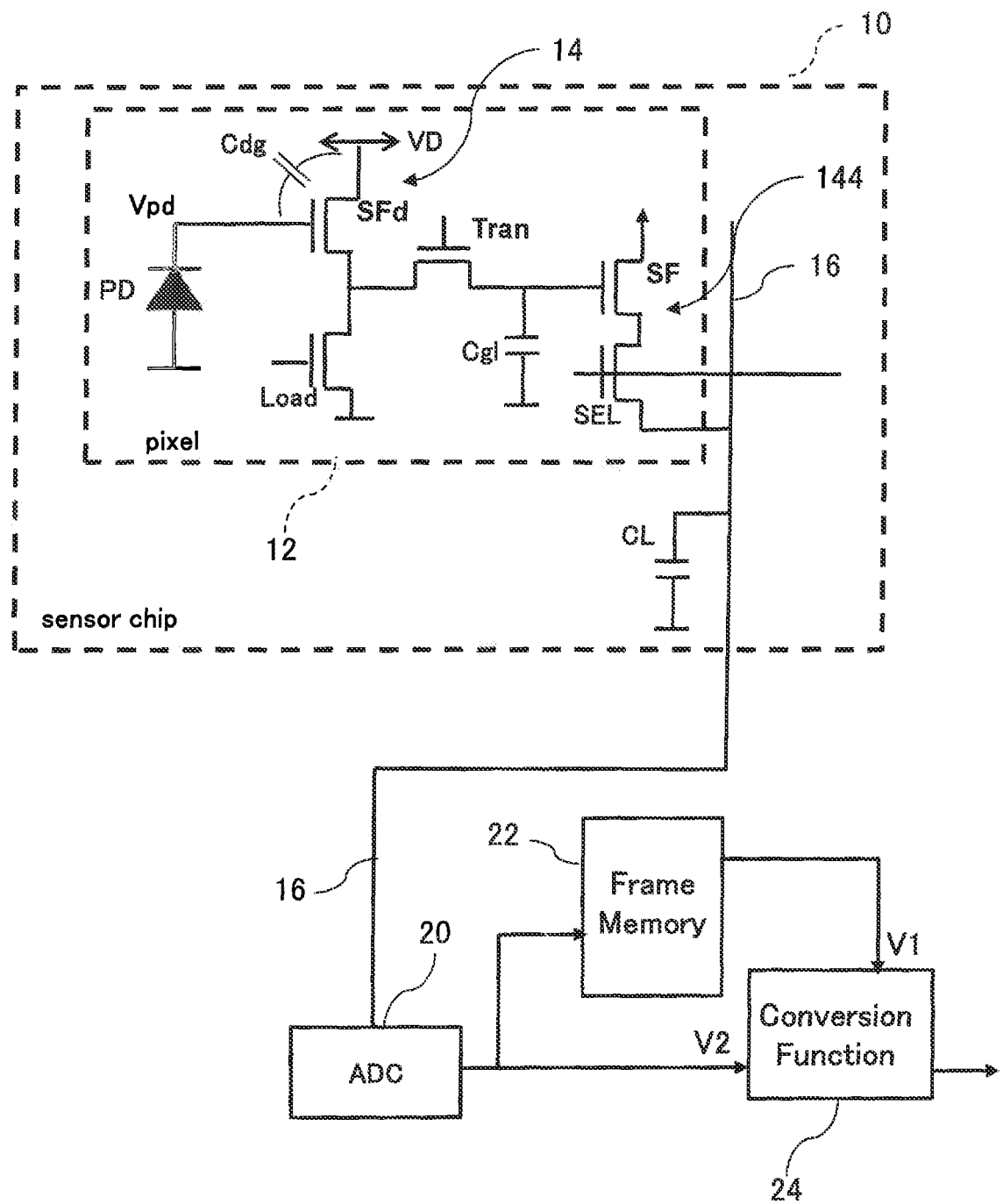
FIG. 10 is a diagram illustrating a configuration according to a modification 2.
Figure 11:
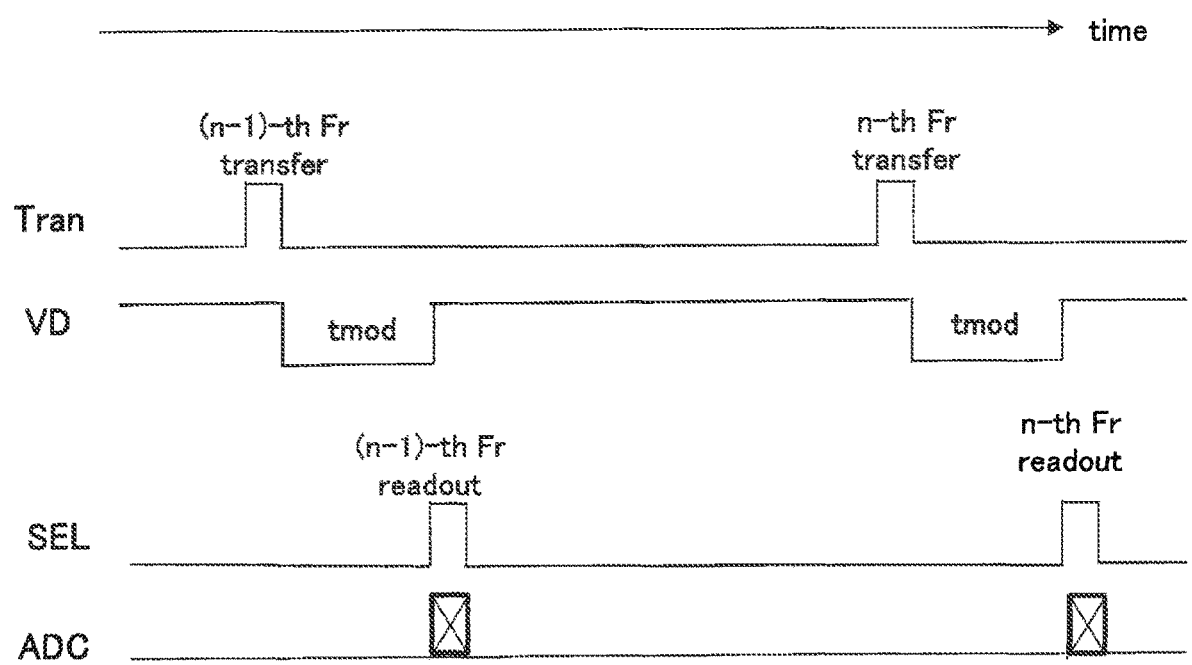
FIG. 11 is a timing chart illustrating operation according to the modification 2.

FIG. 10 is a diagram illustrating a configuration according to a modification 2. FIG. 11 is a timing chart illustrating operation according to the modification 2.

A negative pulse is applied to a drain voltage VD of the pixel source follower transistor SFd, and the output voltage of the photodiode PD is modulated by a drain-gate capacitance (gate capacitance) Cgd of the pixel source follower transistor SFd. In other words, the negative pulse lowering the voltage is applied to the voltage VD during a predetermined application period tmod. The voltage VD is 2.8 V in normal time, the voltage V1 is assumed to be 0 V to −0.7 V, and the negative pulse is set to −0.2 V.

Figure 12:
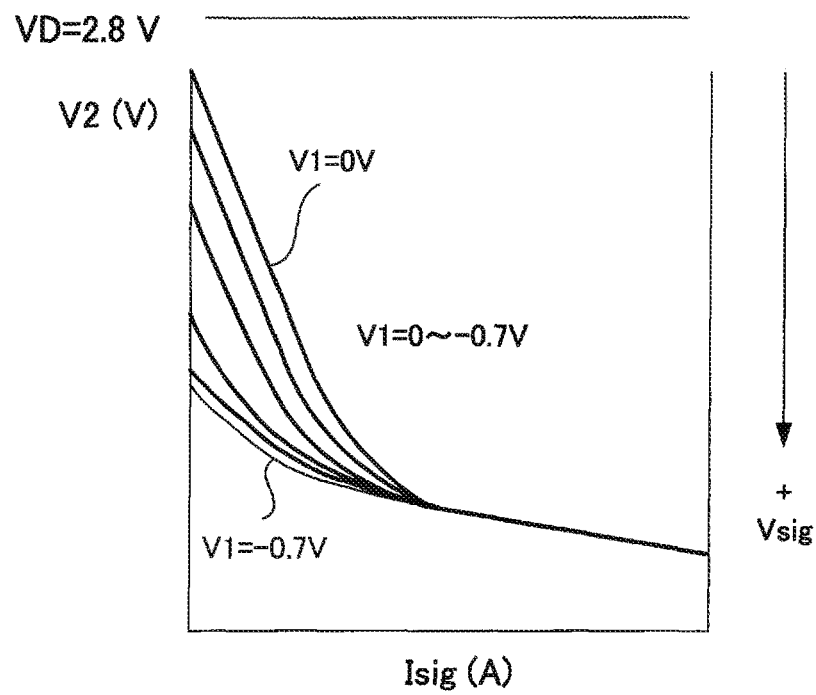
FIG. 12 is a diagram illustrating relationship of a signal (output voltage) V2 to a signal current Isig in a case where a negative pulse is not applied.
Figure 13:
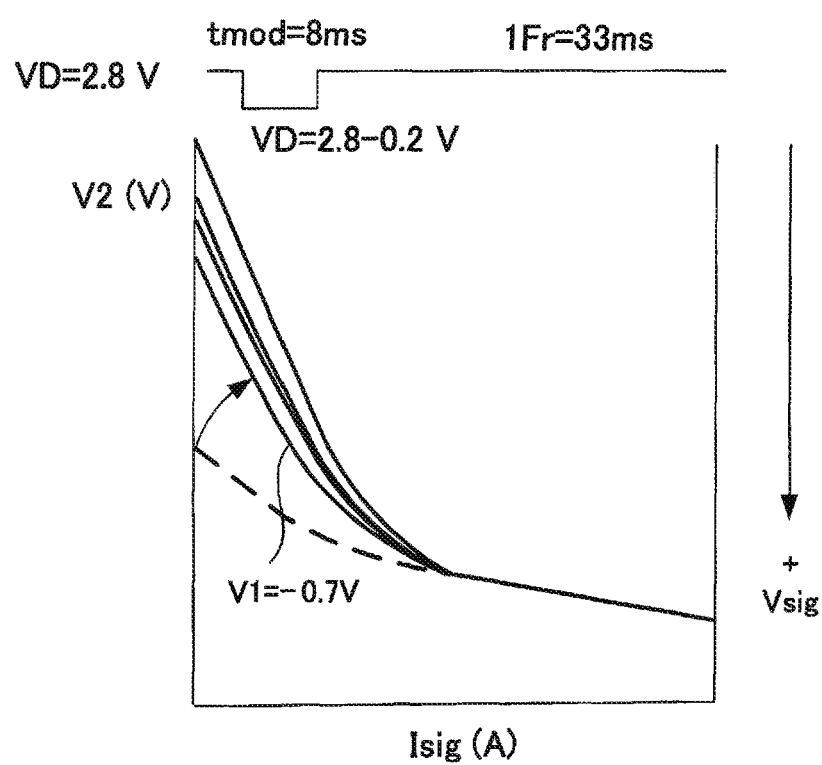
FIG. 13 is a diagram illustrating the relationship of the signal (output voltage) V2 to the signal current Isig in a case where the negative pulse is applied.

FIG. 12 and FIG. 13 are diagrams each illustrating relationship of the signal (output voltage) V2 to the signal current Isig. FIG. 12 illustrates a case where the negative pulse is not applied, and FIG. 13 illustrates a case where the negative pulse is applied. In this example, one frame period (1 Fr) is set to 33 ms, and the negative pulse application period tmod is set to 8 ms.

When the negative pulse is applied to the voltage VD as described above, the negative pulse is applied to the output end of the photodiode PD through the capacitor Cgd of the pixel source follower transistor SFd, and the voltage at the output end of the photodiode PD is lowered. As a result, the photodiode PD is put into a state similar to a state where the accumulated charge is large, Therefore, as illustrated in FIG. 13, influence of the voltage V1 is reduced and inclination of V2 vs. Isig is improved in a region where the voltage V1 is greater than 0.2 V. That means that signal responses are improved in the V1 range of over 0.2V.

Figure 14:
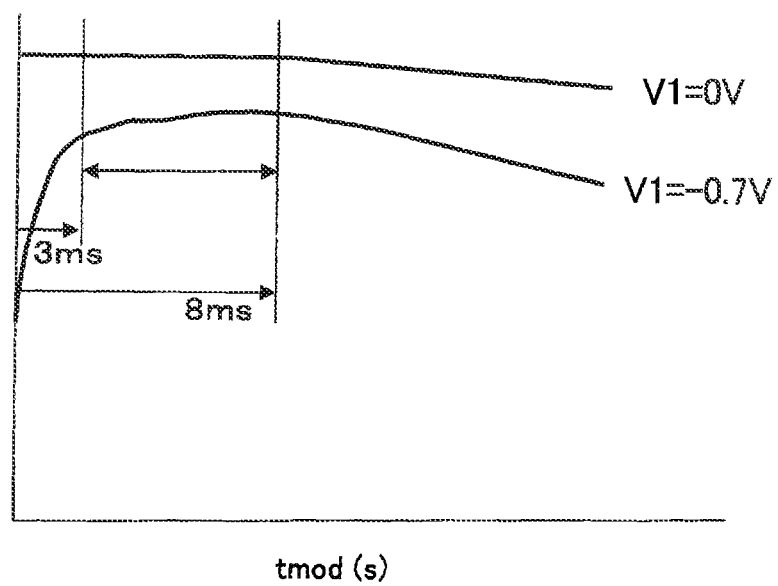
FIG. 14 is a diagram illustrating dV2/dIsig at a voltage V1 of 0 V and −0.7 V in a case where a negative pulse application period tmod is changed.

FIG. 14 illustrates dV2/dIsig at the voltage V1 of 0 V and −0.7 V in a case where the negative pulse application period tmod is changed. When the negative pulse application period tmod is lengthened, dV2/dIsig at the voltage V1 of 0 V is deteriorated.

Accordingly, it is found that, in a case where the one frame period is 33 ms, the negative pulse application period tmod of about 3 ms to about 8 ms is appropriate. In other words, the negative pulse application period tmod is preferably set to a period shorter than half one frame period.

Modification 3

Figure 15:
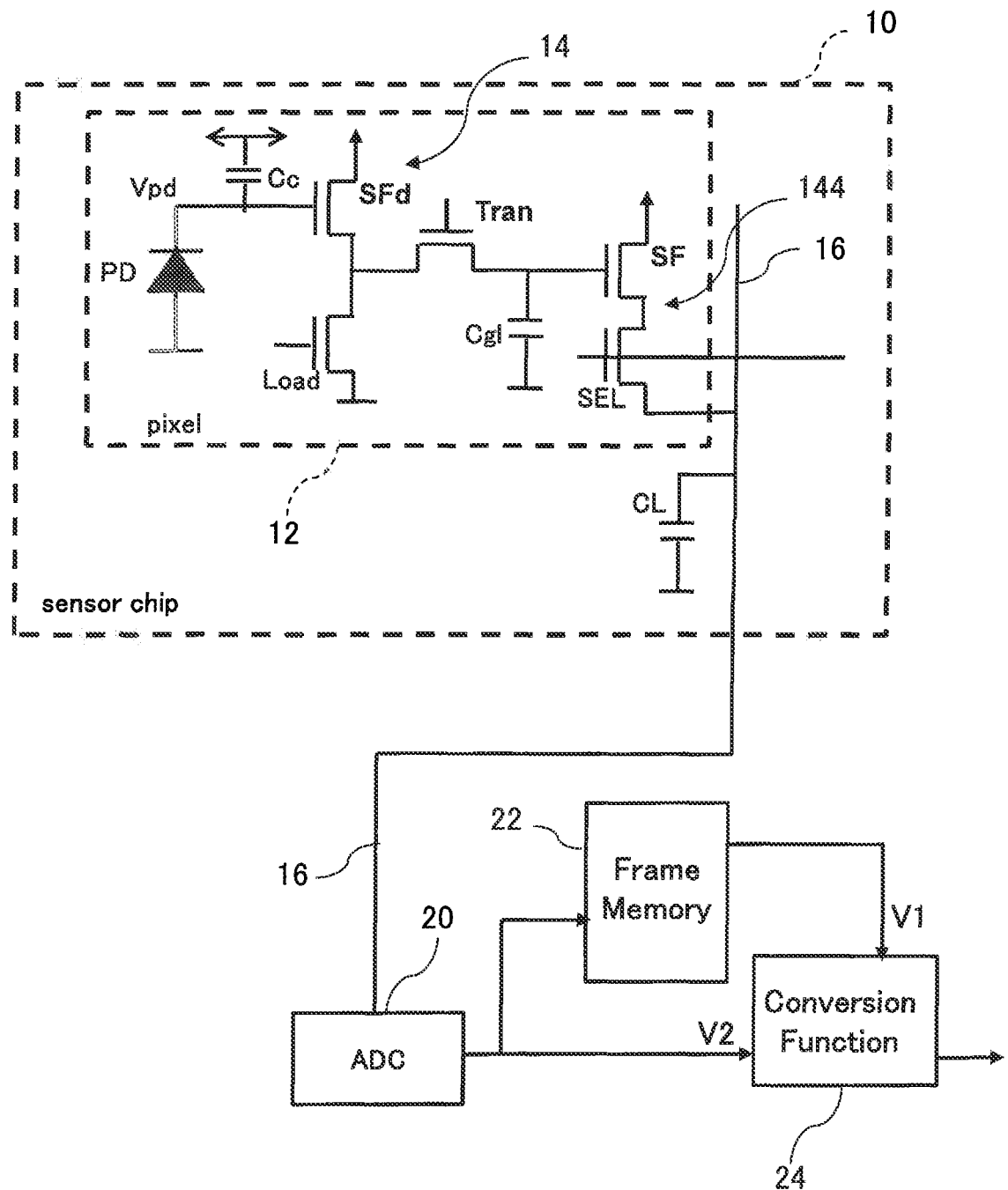
FIG. 15 is a diagram illustrating a configuration according to a modification 3.
Figure 16:
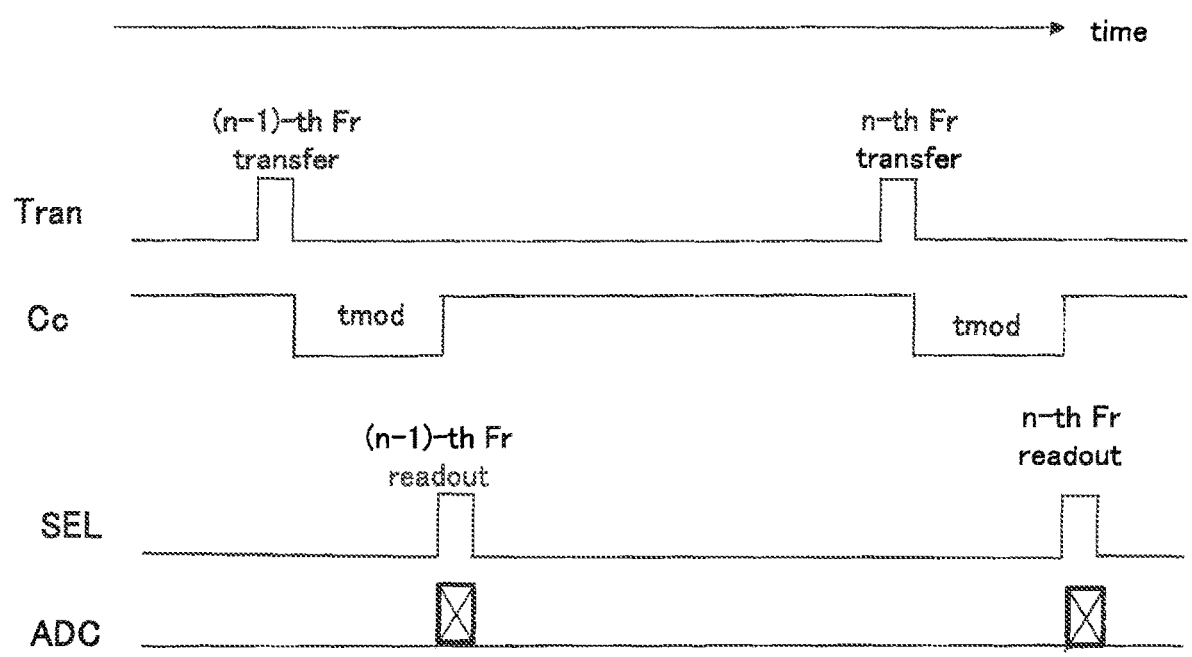
FIG. 16 is a timing chart illustrating operation according to the modification 3.

FIG. 15 is a diagram illustrating a configuration according to a modification 3. FIG. 16 is a timing chart illustrating operation according to the modification 3.

In the modification 2, the gate capacitance of the pixel source follower transistor SFd is used, whereas in the modification 3, a capacitor Cc is connected to the output end of the photodiode PD, and the negative pulse is applied to the output end of the photodiode PD through the capacitor Cc. In this case, the negative pulse is preferably applied during a period shorter than half one frame period.

With such a configuration, it is possible to achieve effects similar to the effects according to the modification 2.

Modification 4

As described above, in the image sensor according to the present embodiment, the reset transistor is omitted from the pixel circuit. In a case where such an imaging sensor is used for an on-vehicle camera, an LED flicker in the logarithmic region becomes a problem. For example, US20210084243 A1 proposes that the flicker caused by the LED is suppressed using a peak hold circuit.

Figure 17:
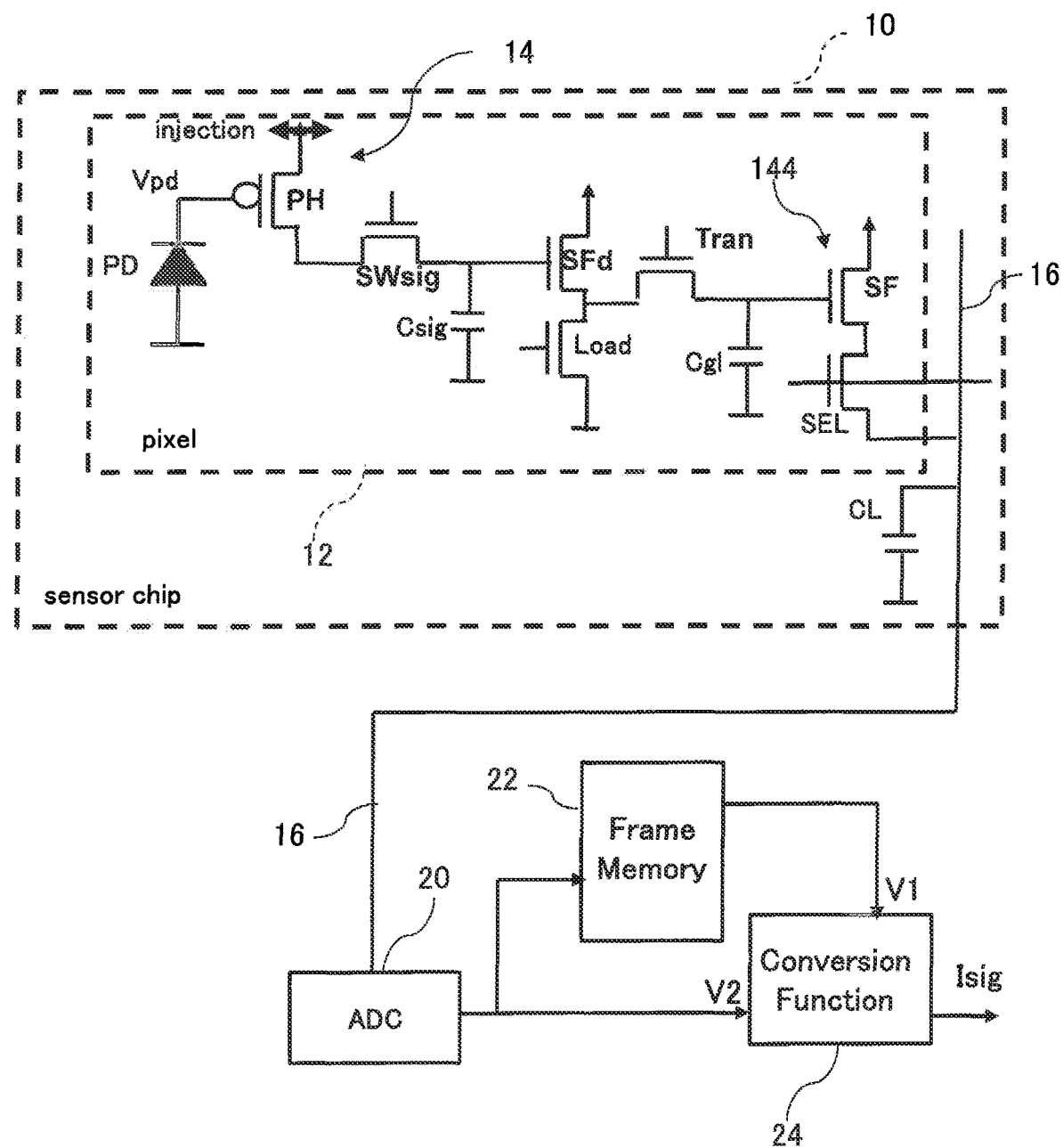
FIG. 17 is a diagram illustrating a configuration according to a modification 4.

FIG. 17 is a diagram illustrating a configuration according to a modification 4, and illustrates a configuration in which a peak hold circuit 14 is inserted between the photodiode PD and the pixel source follower transistor SFd to suppress the LED flicker.

The peak hold circuit 14 includes a p-channel peak hold transistor PH, an n-channel switch transistor SWsig, and a holding capacitor Csig.

A drain of the peak hold transistor PH is connected to an injection power supply that is pulse-driven, and a source is connected to a drain of the switch transistor SWsig. A source of the switch transistor SWsig is connected to a power supply (e.g., ground) through the holding capacitor Csig, and the gate of the pixel source follower transistor SFd.

The load transistor Load, the transfer transistor Tran, and the transfer capacitor Cgl are connected in a manner similar to FIG. 5. The pixel source follower transistor SFd, the load transistor Load, and the transfer transistor Tran are all n-channel FETs.

Figure 18:
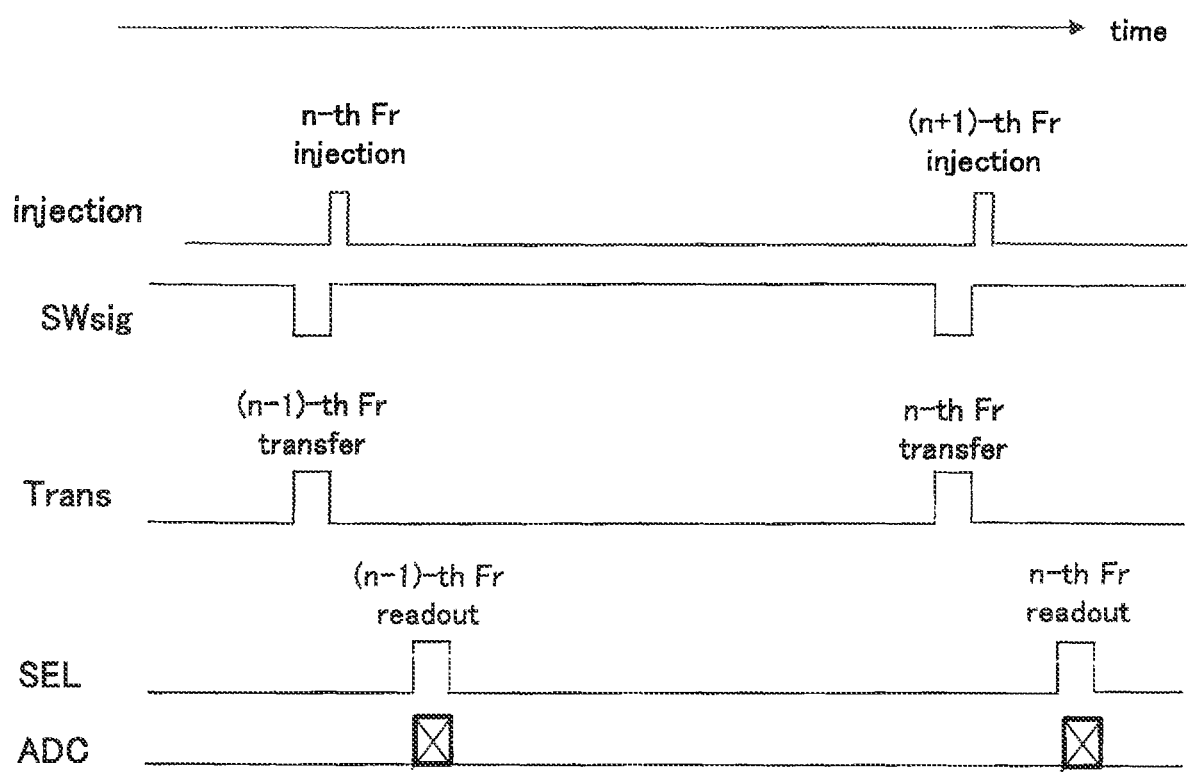
FIG. 18 is a timing chart illustrating operation according to the modification 4.

FIG. 18 is a timing chart illustrating operation according to the modification 4. When the accumulation time of the (n−1)-th frame ends, the transfer transistor Tran is turned on while the switch transistor SWsig is off. As a result, the voltage held in the holding capacitor Csig in the (n−1)-th frame is transferred to the transfer capacitor Cgl through the pixel source follower transistor SFd and the transfer transistor Tran.

The operation is simultaneously performed on the pixels two-dimensionally arranged in common. In other words, the signal accumulation time is the same among all the pixels.

After the signal voltages are held in the transfer capacitors Cgl of all the pixels in the above-described manner, the transfer transistors Tran are turned off.

Next, the switch transistor SWsig is turned on, and the injection power supply connected to the drain of the peak hold transistor PH is set to a high level for a short period in the state. As a result, holes are injected into the holding capacitor Csig through the peak hold transistor PH and the switch transistor SWsig. Further, in a state where the switch transistor SWsig is on, the voltage (signal voltage of n-th frame) corresponding to the voltage at the output end of the photodiode PD is accumulated in the holding capacitor Csig.

On the other hand, the signal voltages are held in the transfer capacitors Cgl of all the pixels. Therefore, the row selection transistors SEL of the pixels in each horizontal line are sequentially turned on, and the signals of the pixels in each row are sequentially read out and supplied to the AD converter 20. As a result, the signals of the (n−1)-th frame are supplied to the AD converter 20.

The AD converter 20 performs AD conversion to supply the current signal V2 (digital signal) of each of the pixels to the frame memory 22 and the conversion function block 24. The conversion function block 24 is supplied with the signal V1 of the previous frame from the frame memory 22. The conversion function block 24 outputs the true signal Isig by using the conversion table from the signal V1 of the previous frame from the frame memory 22 and the current signal V2.

In the above-described manner, in all the pixels, the signals are accumulated at the same timing, and the LED flicker can be removed by the peak hold circuits.

Modification 5

Figure 19:
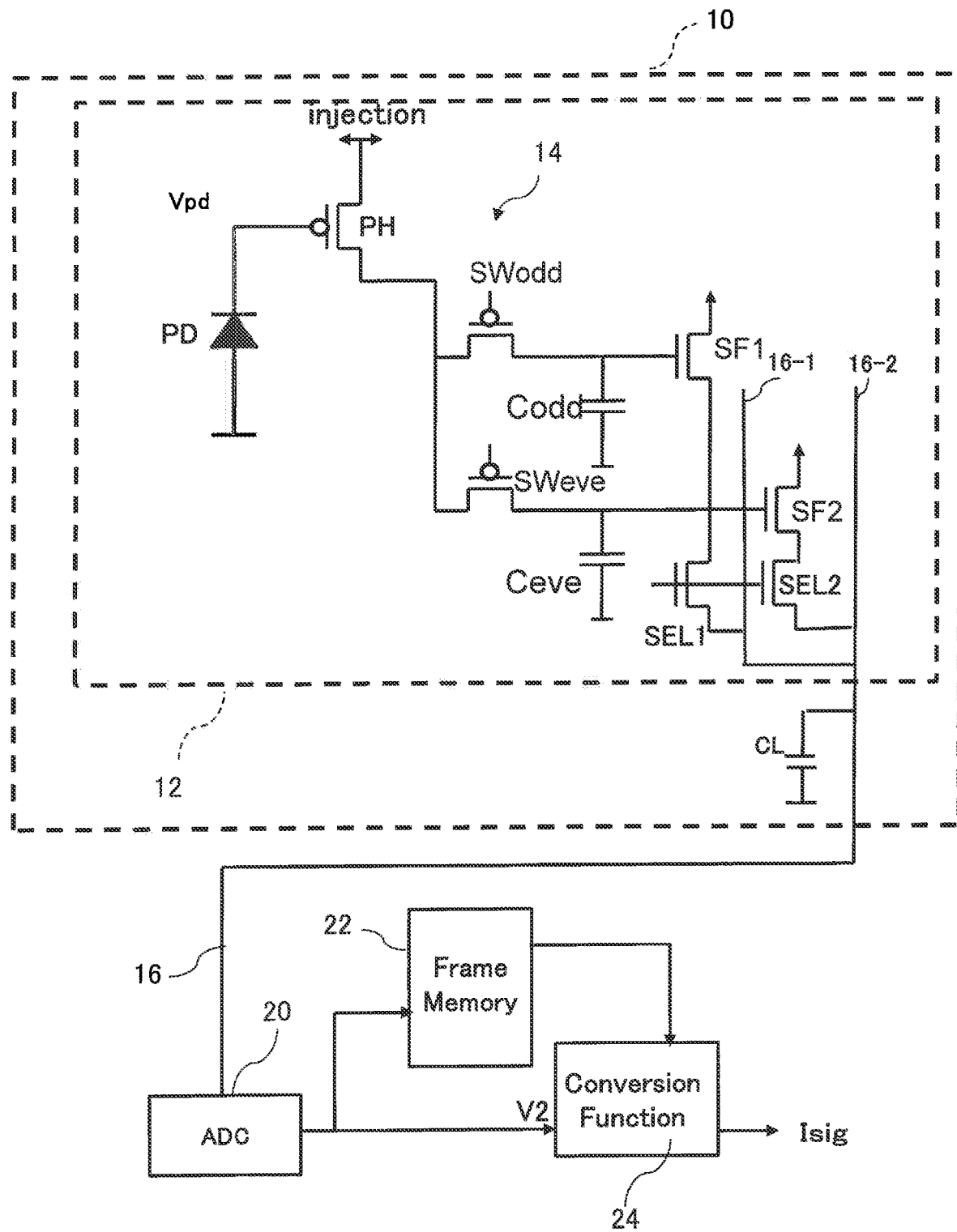
FIG. 19 is a diagram illustrating a configuration according to a modification 5.

FIG. 19 is a diagram illustrating a configuration according to a modification 5. In the modification 5, two switch transistors, namely, a switch transistor SWodd and a switch transistor SWeve are connected to the peak hold circuit 14. Further, a holding capacitor Codd and a gate of a source follower transistor SF1 are connected to the switch transistor SWodd, and a holding capacitor Ceve and a gate of a source follower transistor SF2 are connected to the switch transistor SWeve.

With this configuration, the two holding capacitors Codd and Ceve can separately hold the signals. In this example, in an odd-numbered frame, the switch transistor SWodd is turned on, and the signal of the frame is accumulated in the holding capacitor Codd. At this time, the switch transistor SWeve is off, and the holding capacitor Ceve holds the signal of a previous even-numbered frame. In this state, the source follower transistors SF2 of the pixels in each horizontal line are sequentially turned on to supply the signals of the even-numbered frame to the AD converter 20. This makes it possible to output true signals of the even-numbered frame from the conversion function block 24.

In the next even-numbered frame, the switch transistor SWeve is turned on, and the switch transistor SWodd is turned off. As a result, the signal of the even-numbered frame can be accumulated in the holding capacitor Ceve, and the signal of the odd-numbered frame can be read out from the holding capacitor Codd.

Further, when the on/off timings of the switch transistor SWodd and the switch transistor SWeve are set to the same timings among all the pixels, the accumulation time can be set to be the same among all the pixels.

Note that, at the beginning of the integration, the holes are injected into the holding capacitors Codd and Ceve in a manner similar to the above-described case.

What is claimed is:

1. An image sensor comprising:
a plurality of pixels, wherein each pixel of the plurality of pixels includes:
a photodiode configured to operate both in a linear mode in which the photodiode shows a linear response to a light incident amount and in a photovoltaic mode in which the photodiode shows a logarithmic response to the light incident amount,
a pixel source follower transistor configured to output a signal voltage corresponding to a signal generated based on an output of the photodiode,
a pixel switch transistor configured to turn on/off an output of the pixel source follower transistor,
a holding capacitor connected to an output end of the switch transistor and configured to hold a voltage corresponding to the output of the photodiode, and
an output source follower circuit configured to output a voltage held by the holding capacitor as a signal voltage;
an AD converter, wherein the AD converter converts the signal voltage output from the output source follower circuit of each pixel of the plurality of pixels into digital signal data;
a frame memory, wherein the frame memory stores the digital signal data of one frame period;
a conversion function block, wherein the conversion function block generates an optical signal relating to the light incident amount from digital signal data of a current frame and digital signal data of a previous frame, wherein the pixel switch transistors of the plurality of pixels of the whole image sensor are turned on at a same timing, and hold the signal voltages in the holding capacitors.

2. The image sensor according to claim 1, wherein the conversion function block generates the optical signal from the digital signal data of the current frame and the digital signal data of the previous frame by using a Lambert W function.

3. The image sensor according to claim 1, wherein the conversion function block includes a numerical table for obtaining the optical signal from the digital signal data of the current frame and the digital signal data of the previous frame.

4. The image sensor according to claim 1, wherein the pixel source follower transistor is driven in a state where one or no charge is present in a channel of the pixel source follower transistor.

5. The image sensor according to claim 1, wherein a current flowing through a source of the pixel source follower transistor is made greater than $I_{drk}^2$ divided by $I_{deq}$, where Idrk is a sum of dark currents generated from the pixel source follower transistor, a load transistor, and the pixel switch transistor, and Ideq is a value obtained by dividing a number of elementary charges q by time in the unit of a second (=q/s).

* * * * *